July 13, 1937. D. CLARK 2,086,524
VEHICULAR ILLUMINATING MEANS
Filed Nov. 18, 1935 3 Sheets-Sheet 2
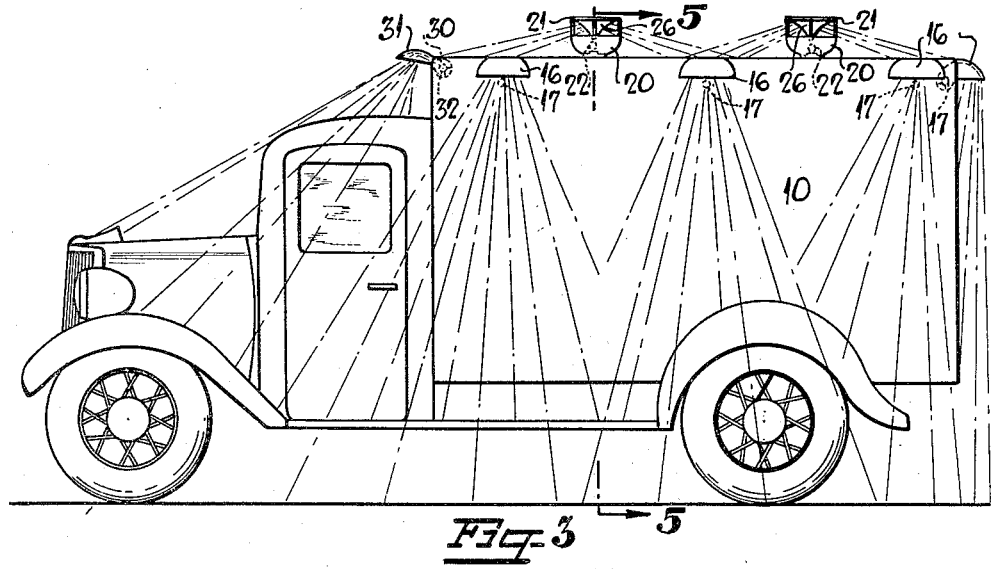
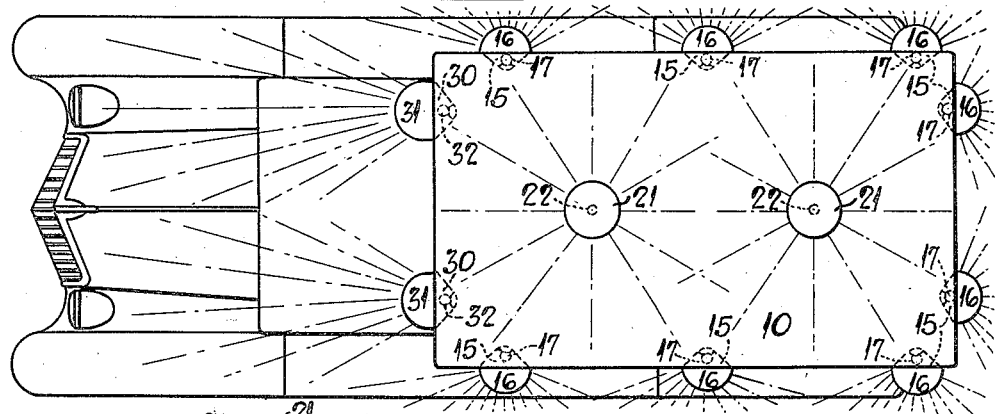
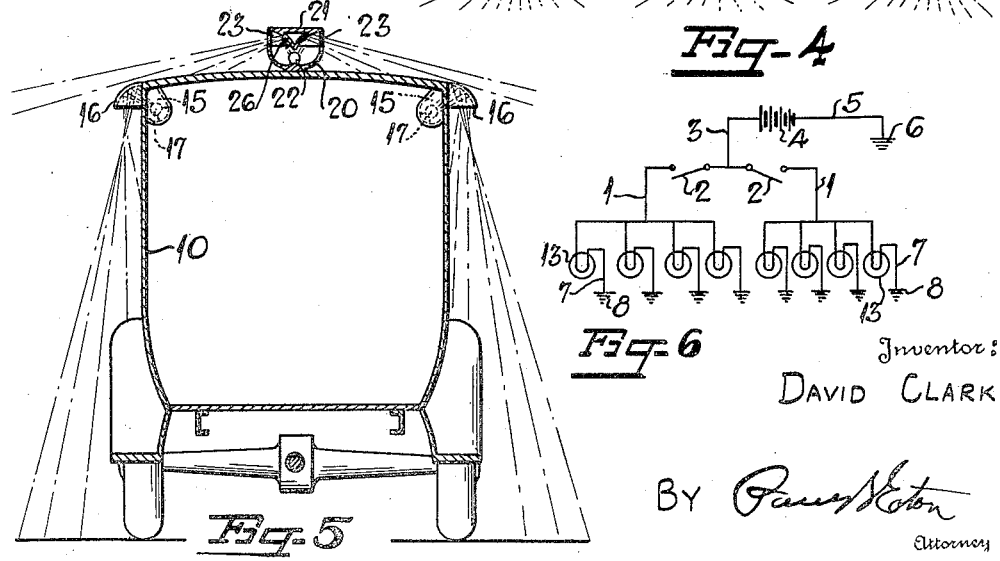
Inventor:
DAVID CLARK
By Percy Eaton
Attorney July 13, 1937.　　　　　D. CLARK　　　　　2,086,524
VEHICULAR ILLUMINATING MEANS
Filed Nov. 18, 1935　　　3 Sheets-Sheet 3
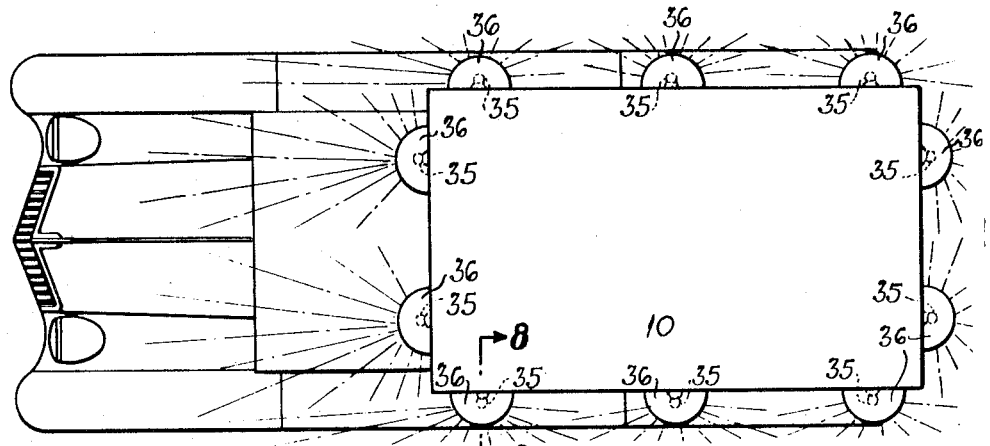
*Fig-7*
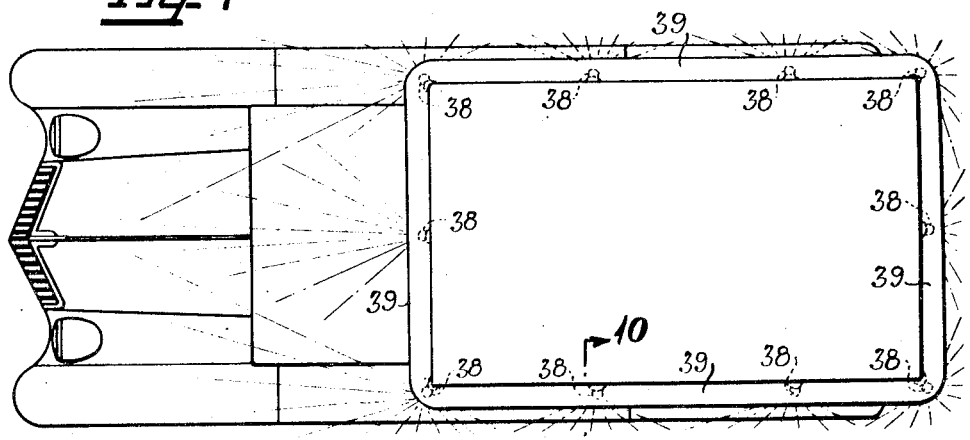
*Fig-9*
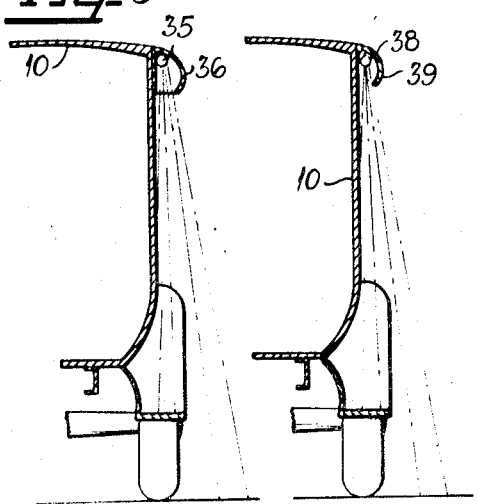
*Fig-8*　　*Fig-10*
David Clark
Inventor
By Patented July 13, 1937

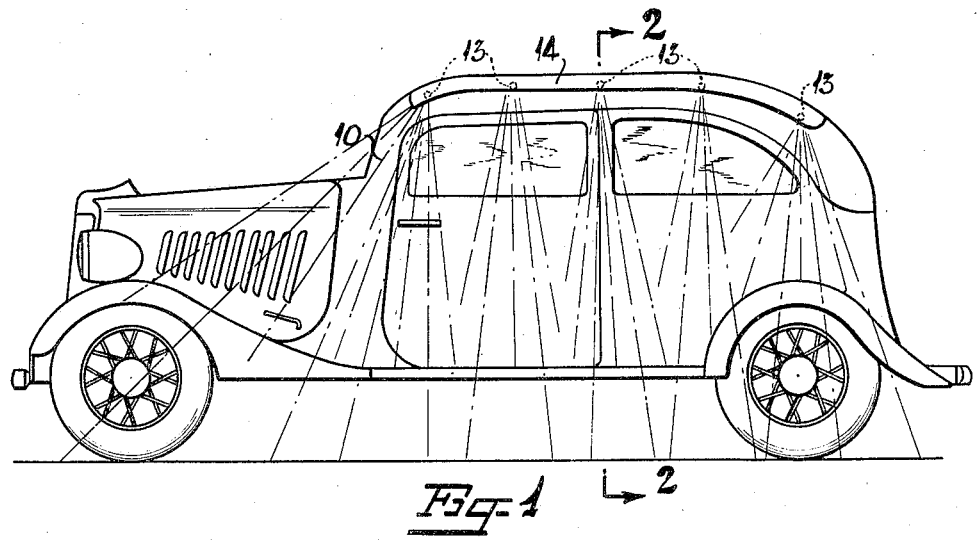
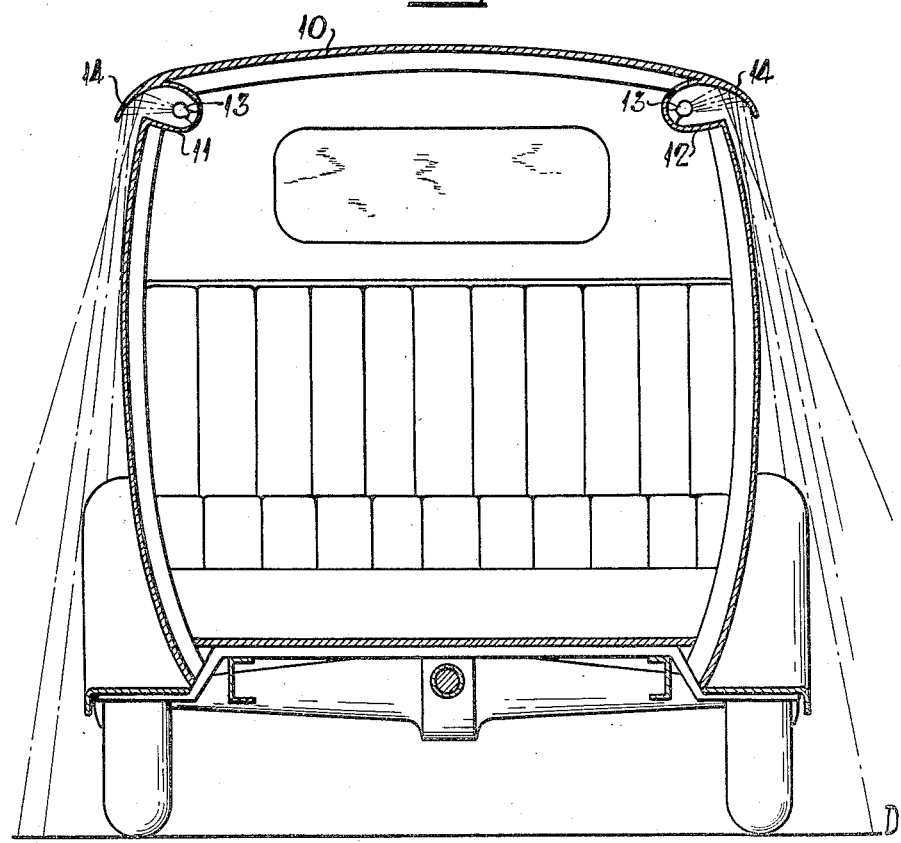

2,086,524

UNITED STATES PATENT OFFICE 2,086,524

VEHICULAR ILLUMINATING MEANS

David Clark, Charlotte, N. C.

Application November 18, 1935, Serial No. 50,395

1 Claim. (Cl. 240—8.2)

This invention relates to the method and means for illuminating the exterior of an automotive vehicle so that the same may be clearly visible to approaching drivers and thus avoid collisions between automotive vehicles by reason of blinding or glaring lights.

It is an object of this invention to provide along the sides, front and rear of the body of an automotive vehicle a lighting system whereby direct or indirect rays of light will be cast upon the exterior of the vehicle and upon the nearby roadway so as to make the automotive vehicle visible to approaching and overtaking drivers.

It is another object of this invention to provide in or on the body of an automotive vehicle channels or pockets having light sockets therein, into which electric bulbs can be inserted and which will cast rays of light directly onto the sides of the vehicle or onto a suitable reflector, so as to direct the rays of light onto the exterior surface of the vehicle, and also onto the adjacent roadway. This arrangement will enable a driver to plainly see an approaching automotive vehicle and to determine accurately the relative position that the automotive vehicle occupies in relation to the roadway, even though the approaching automotive vehicle has glaring and blinding headlights.

It is a further object of this invention to provide along the sides, front and rear of the body of an automotive vehicle, a lighting system comprising a plurality of spaced light bulbs disposed beneath shades for directing the light rays directly upon the sides of the automotive vehicle and the adjacent roadway. This form is particularly adapted for use on trucks where the body lines and the exterior appearance does not have to conform to any precise design. It has a further advantage of not requiring such an intense beam of light to illuminate the vehicle as in the case where indirect lighting systems are used. This arrangement provides means whereby the light rays will outline the body of the car and the roadway but the source of the light will not be visible to an approaching or overtaking driver; consequently, there will be no blinding or glaring effects. The sources of light for illuminating the exterior of the automotive vehicle may be neon tubing or any other suitable source of light which may be desired.

Some of the objects of the invention having been stated, other objects will appear as the description proceeds when taken in connection with the accompanying drawings, in which:—

Figure 1 is an elevation of a passenger automotive vehicle equipped with my invention;

Figure 2 is a transverse vertical sectional view taken along line 2—2 in Figure 1;

Figure 3 is a side elevation of an automotive truck equipped with a slightly modified form of an indirect lighting equipment;

Figure 4 is a top plan view of Figure 3;

Figure 5 is a transverse vertical sectional view taken along line 5—5 in Figure 3;

Figure 6 is a wiring diagram for the lighting arrangement shown in Figures 1 and 2;

Figure 7 is a plan view of an automotive vehicle showing another modified form in which a direct lighting system is used for lighting the sides of an automobile or truck and the adjacent roadway;

Figure 8 is a vertical sectional view through one side of the automotive vehicle taken along the line 8—8 in Figure 7;

Figure 9 is another modified form showing a direct lighting system applied to an automotive vehicle using a continuous shade or channelway instead of a plurality of individual shades as shown in Figure 7;

Figure 10 is a vertical sectional view taken through one side of the automotive vehicle along the line 10—10 in Figure 9.

Referring more specifically to the drawings, the numeral 10 indicates the body of an automotive vehicle and this body has along the upper outer edges thereof channels 11 and 12, which are disposed on opposite sides of the automobile body. These channels are provided with sockets for the accommodation of a plurality of light bulbs 13 which are connected by a suitable circuit to the battery of the automobile. The channels have a covering member or reflector 14 which projects outwardly and downwardly to direct the rays of light onto the sides of the automobile, and onto the roadway. These channels are closed at their forward and rearward ends to prevent direct rays of light from the bulbs 13 being visible to any one in front of or behind the automobile.

Figure 6 shows a wiring diagram for the bulbs 13. Each of these bulbs is connected by a wire 1 to one side of a switch 2 and leading from this switch is wire 3 which is connected to a conventional battery 4. Wire 5 leads from the other side of the battery to a suitable ground 6. Likewise each of the bulbs has a ground wire 7 leading therefrom to a ground 8. When it is desired to light up only one side or one end of the car, only one of the switches 2 is closed to complete the circuit to those bulbs desired to be illuminated.

In Figures 3 to 5 inclusive, a slightly modified form of the invention is shown in which, instead of having the continuous channels 11 and 12, a plurality of individual pockets 15 are provided on each side of the upper, outer portion of the body of a truck and suitable shades or reflectors 16 are provided to cover these pockets 15. In each pocket 15 a light bulb 17 is mounted which is connected to a suitable circuit, leading to the battery of the automobile, which is similar to the circuit shown in Figure 6. The light rays from the bulbs 17 strike the reflectors 16 and are directed downwardly onto the sides of the truck body.

Also, if it is desired to illuminate the top of the truck body, I provide suitable upstanding members 20 which have the reflectors 21 to cast the rays of light from the bulb 22 mounted therein onto the top portion of the truck body through openings 23. These reflectors 21, which are mounted on the top of the members 20 have reflector surfaces 26 which divide the rays of light from the bulbs 22 and direct them radially about the reflector on top of the vehicle.

It is thus seen that I have provided means for indirectly illuminating the exterior of an automobile or truck so that the truck will be outlined to approaching drivers and its location with relation to the road accurately determined.

Also, if desired, I can provide a suitable pocket 30 in the front of the truck or automobile body and have a reflector 31 disposed in front of the same with a light bulb 32 in the cavity 30 so that indirect rays of light may be cast onto the cab of the truck and onto the hood and front portions of the truck.

This arrangement will provide a continuous row of lights around the upper edge of the body of a motor vehicle with means for casting the indirect rays from said lights downwardly onto the side of the truck and onto the roadway.

In Figures 7 and 8, a modified form of lighting system is shown in which a plurality of light bulbs 35 are disposed along the upper exterior portion of the automotive vehicle, each light bulb 35 having a shade 36 for shielding the direct rays of light from the eyes of an approaching or overtaking driver and for directing the light rays downwardly on the side of the automotive vehicle and onto the adjacent roadway. The shades are so located with respect to the light bulbs that the direct rays of light from the bulbs 35 are not visible to an approaching or overtaking driver. This form of direct lighting is particularly adaptable for use on trucks and automotive vehicles where the body lines do not have to conform to any special design, that is, where a slight irregularity in the exterior appearance thereof is not objectionable.

Figures 9 and 10 show still another modified form of direct lighting system for automotive vehicles in which a plurality of light bulbs 38 are disposed around the upper edge of the body of the vehicle with a continuous shade or channel-way partially enclosing all of said light bulbs to direct the light rays downwardly on the sides of the vehicle and onto the adjacent roadway. This channel-way also serves to prevent the source of light from being visible to an approaching driver. In the forms of the invention shown in Figures 7 to 10 inclusive, a saving of light current is effected since by having the light rays from the bulbs directly cast upon the objects desired to be lighted less light is required than in the case where an indirect lighting system is used. In the forms showing a channel, neon tubing may be effectively employed.

In the drawings and specification there has been set forth a preferred embodiment of the invention, and although specific terms are employed, they are used in a generic and descriptive sense only, and not for purposes of limitation, the scope of the invention being set forth in the appended claim.

I claim:

In a vehicle body having a top and sidewall members provided with horizontal light reflecting cavities disposed at the junction point of said members, a source of light disposed in said cavities, the lower portion of said cavities being disposed in a plane substantially at right angles to the plane of the sidewall and the interior surface of said cavities extending inwardly, upwardly and then downwardly and having said downwardly extending portion occupying an arcuate surface which merges into the plane of said top member at substantially a common tangent point disposed at approximately the same elevation as the intersection of said first named surface and the sidewall member, said downwardly extending portion extending outwardly through the plane defined by an upward projection of the sidewalls, whereby the intersection of the lower portion of said cavities with said sidewalls will form a shoulder to prevent direct rays from striking the side walls of the vehicle and the reflecting surface on said downwardly extending portion will reflect light rays onto said sidewalls.

DAVID CLARK.